US008280310B2

United States Patent
Asanuma et al.

(10) Patent No.: US 8,280,310 B2
(45) Date of Patent: Oct. 2, 2012

(54) WIRELESS COMMUNICATION TERMINAL AUTOMATICALLY CONTROLLING NON-COMMUNICATION MONITORING TIMER

(75) Inventors: Michihiro Asanuma, Chigasaki (JP); Tadashi Shimizu, Tokyo (JP); Akio Kawase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 12/417,906

(22) Filed: Apr. 3, 2009

(65) Prior Publication Data

US 2009/0253378 A1 Oct. 8, 2009

(30) Foreign Application Priority Data

Apr. 4, 2008 (JP) ................. 2008-097708

(51) Int. Cl.
*H04W 52/00* (2009.01)
*H04B 1/00* (2006.01)
(52) U.S. Cl. ................. 455/67.11; 455/127.5
(58) Field of Classification Search ............... 455/67.11, 455/507, 517, 522, 574, 561, 127.5
See application file for complete search history.

(56) References Cited

U.S. PATENT DOCUMENTS 7,756,548 B2 * 7/2010 Laroia et al. ............ 455/561
7,894,862 B2 * 2/2011 Hwang et al. ............ 455/574

FOREIGN PATENT DOCUMENTS

JP 2005-236945 9/2005

OTHER PUBLICATIONS

"cdma2000 High Rate Packet Data Air Interface Specification", 3GPP2 Specification, C.S. 0024 AV3.0:10.2 Default Control Channel MAC Protocal, and 11.1 Default (Subtype 0) and Subtype 1 Physical Layer Protocol Instances, Sep. 2006.

* cited by examiner

*Primary Examiner* — Dean O Takaoka
(74) *Attorney, Agent, or Firm* — Antonelli, Terry, Stout & Kraus, LLP.

(57) ABSTRACT

The present invention provides with a terminal having a monitoring period changing function for changing the value (monitoring period) of a no-traffic monitoring timer of the terminal by feeding back the information on radio signal conditions, and a no-traffic monitoring function for changing the status of the call of the terminal to "a disconnected state for only receiving radio signal from a base station" depending on the value (monitoring period) of the no-traffic monitoring timer based on the information fed back.

8 Claims, 7 Drawing Sheets

(IF $E_{min} \leq e < E_S$)  $T = T_{default}$ (IF $E_S \leq e \leq E_{max}$)  $T = T_{min} + (T_{default} - T_{min}) \times (1 - \dfrac{e - E_S}{E_{max} - E_S})$

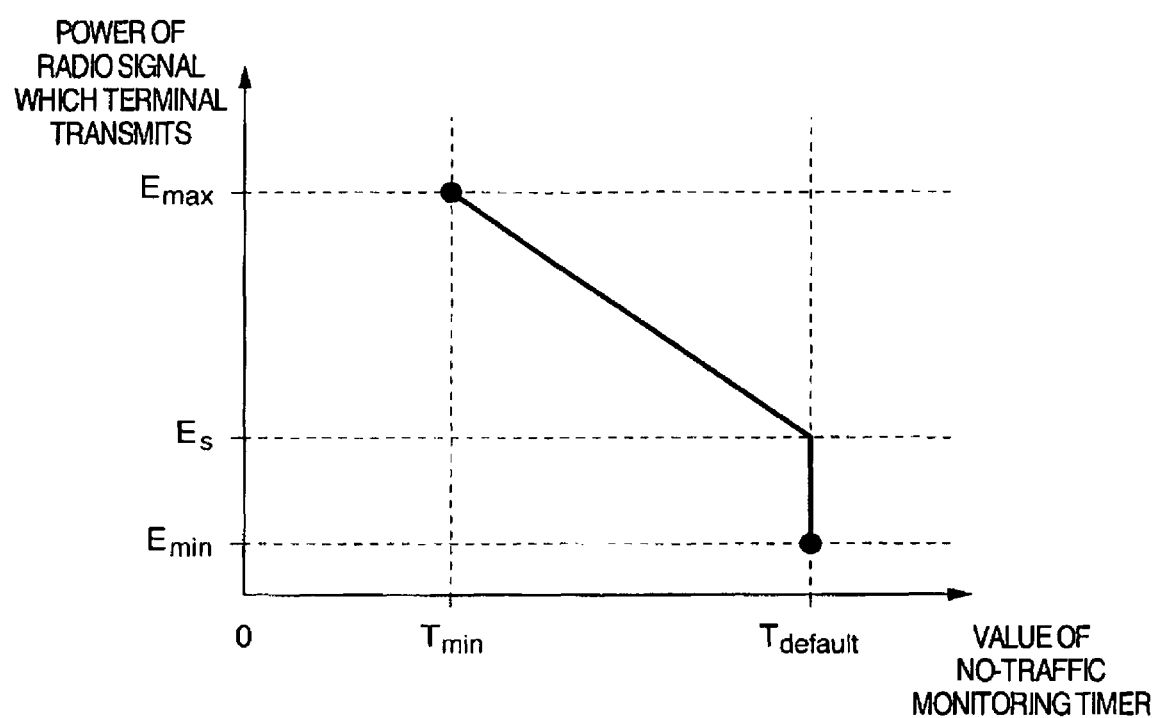

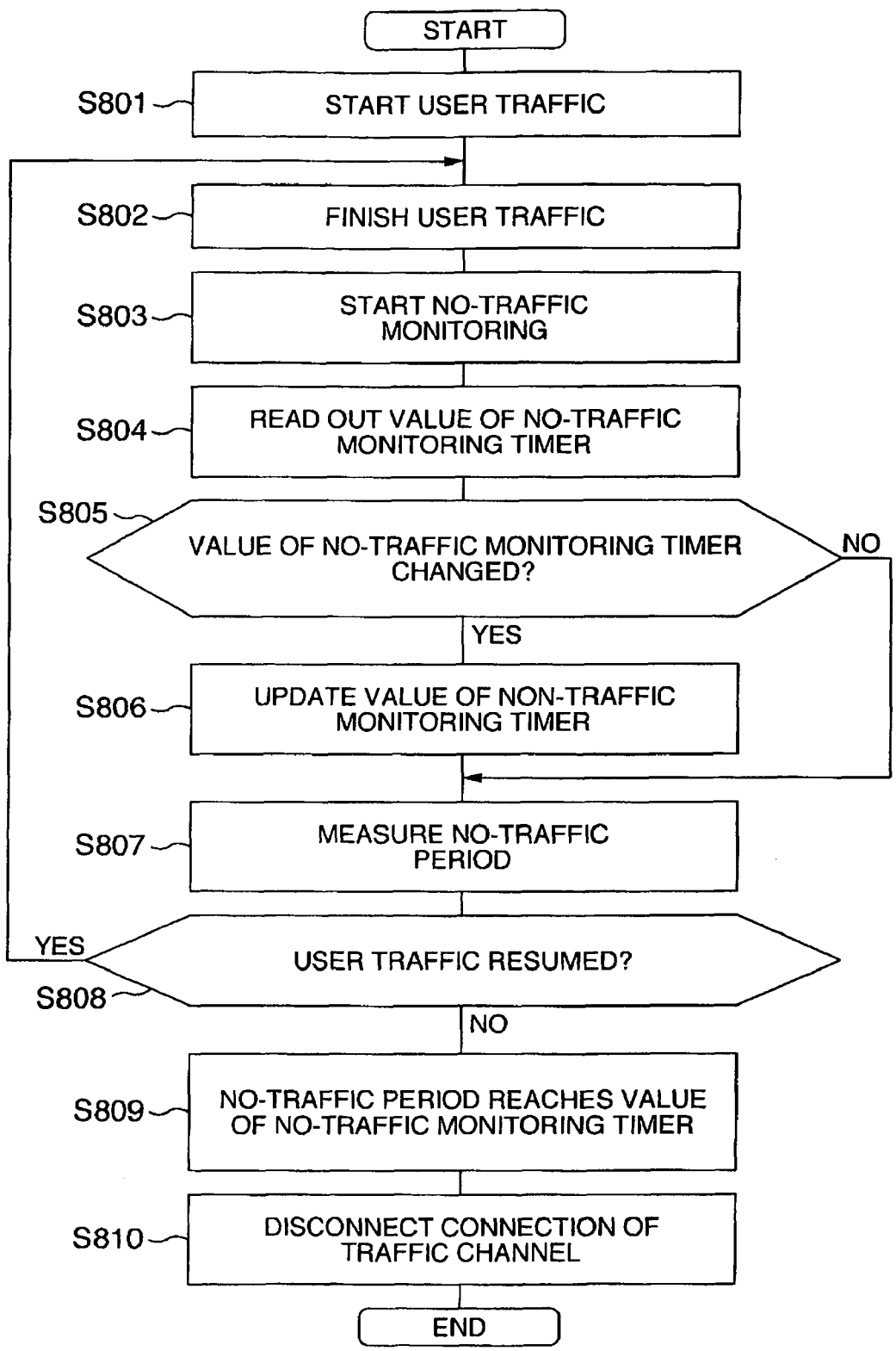

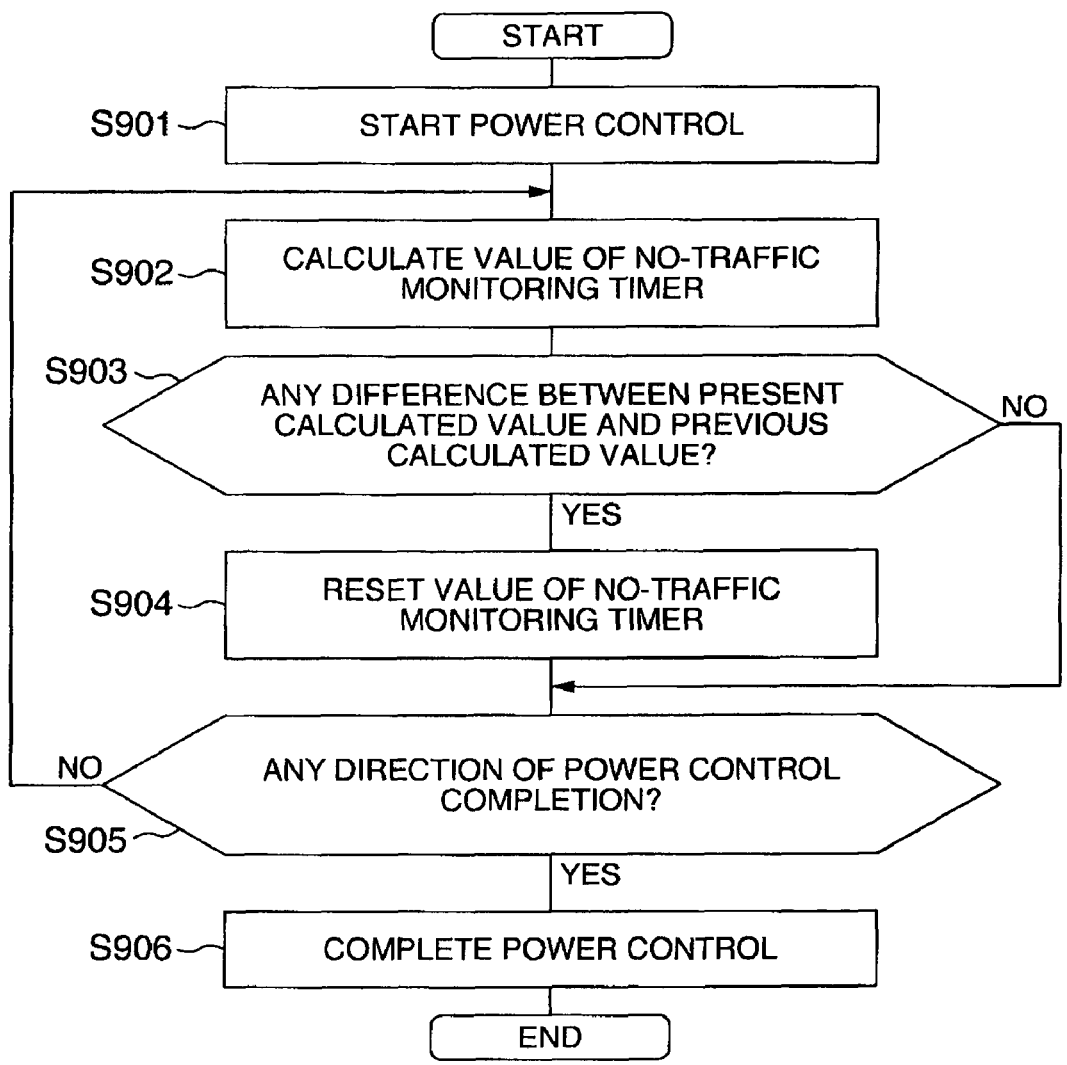

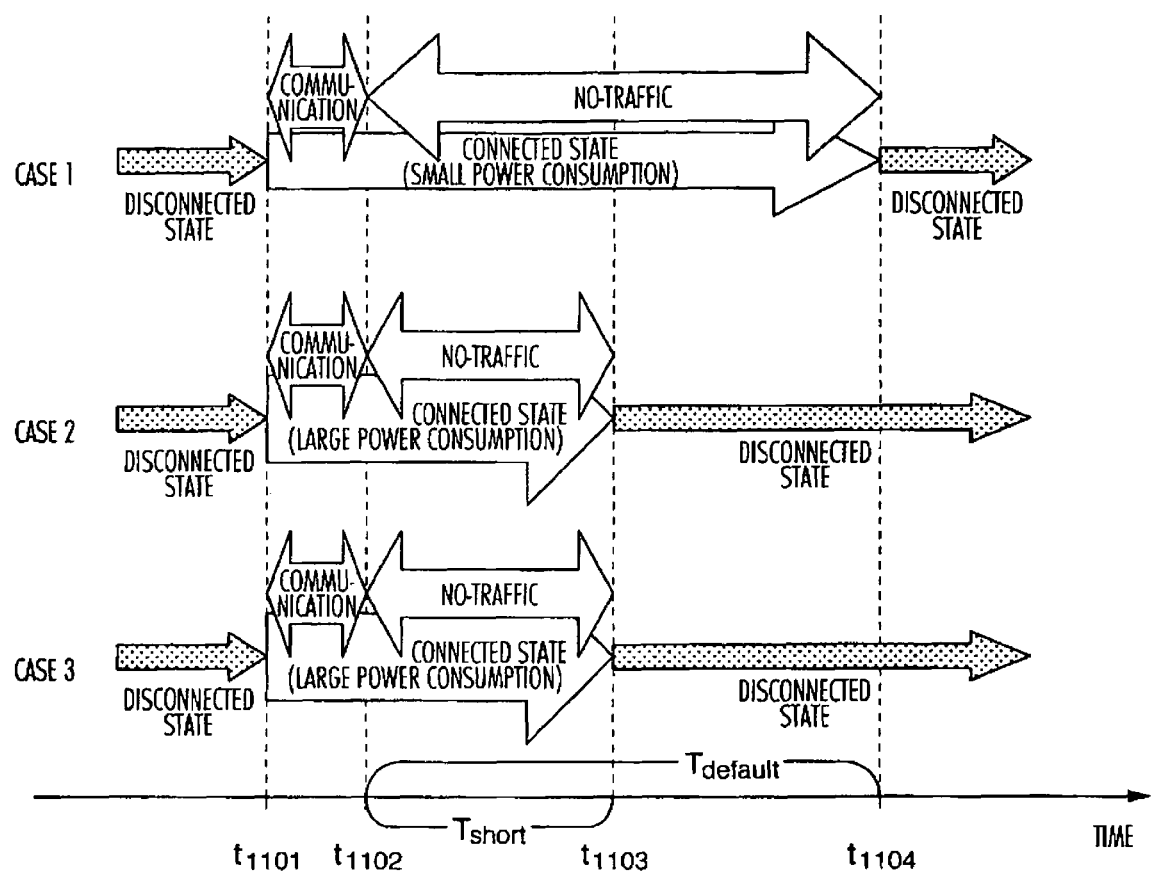

WIRELESS COMMUNICATION TERMINAL AUTOMATICALLY CONTROLLING NON-COMMUNICATION MONITORING TIMER

INCORPORATION BY REFERENCE

The present application claims priority from Japanese application JP2008-097708 filed on Apr. 4, 2008, the content of which is hereby incorporated by reference into this application.

BACKGROUND OF THE INVENTION

The present invention relates to a configuration of a wireless terminal for communicating with a base station.

In the wireless communication using a wireless communication terminal (hereinafter referred to as a "terminal") and a wireless communication base station (hereinafter referred to as a "base station"), there are various communication standards. In the third-generation mobile phone (3G), the communication standards such as CDMA2000 and W-CDMA using the CDMA scheme have become main stream. This CDMA scheme achieves simultaneous connections by incomparably more users than before by using a frequency band or time widely without dividing them, and meets also the data communication speed requirement in recent wireless communication.

However, since the CDMA scheme, due to characteristics of achieving simultaneous connections by many users, causes the Near-Far Problem: "in the same time and the same frequency, the strong radio signal which a terminal near a base station transmits drowns out radio signal from a terminal far from the base station, and as a result, the base station is difficult to receive radio signal from the terminal far from itself." This problem is solved by executing the power control for increasing the power of radio signal which the terminal far from the base station transmits and decreasing the power of radio signal which the terminal near the base station transmits, so that the power of radio signal from any terminal which the base station receives becomes nearly constant. It should be noted that the power control is executed in a very short cycle, such as 800 times/second in CdmaOne and CDMA2000, and 1500 times/second in W-CDMA.

On the other hand, in the CDMA scheme, it is intended to effectively utilize resources required to transmit and receive data by using a no-traffic monitoring function. The no-traffic monitoring function changes the status of the call in a terminal from "a connected state" for transmitting synchronization signal to the base station to "a disconnected state" for only receiving radio signal from the base station, when a certain period has passed in a no-traffic state since the terminal went into the no-traffic state.

SUMMARY OF THE INVENTION

The power of radio signal which the terminal far from the base station transmits becomes large due to the power control as compared with the terminal near the base station, which causes the problem that the terminal's power consumption also becomes high. The above no-traffic monitoring function also has a good aspect of reducing the terminal's power consumption by changing the status of the call of the terminal to "a disconnected state" for only receiving radio signal from the base station. However, it cannot be said that only such reduction of power consumption is sufficient. Accordingly, it is an object of the present invention to reduce the terminal's power consumption, and thus to lengthen a duration of a battery life.

JP-A-2005-236945 relates to a technology for switching between a normal operation mode and a low power consumption mode based on the power level of received signals, but the problem that the power control causes the difference of power consumption between the terminal far from the base station and the terminal near the base station cannot be solved by simply suppressing power consumption to a low level in the low consumption mode.

In order to solve the above problem, the present invention provides a terminal having a monitoring period changing function for changing the value (monitoring period) of a no-traffic monitoring timer of a terminal by feeding back the information on a radio signal condition, and a no-traffic monitoring function depending on the value (monitoring period) of the no-traffic monitoring timer based on the information fed back. This problem is solved because, in monitoring a no-traffic condition in a weak radio signal area, that is, in the case where the terminal's power consumption per unit time is high although the terminal does not have a data to communicate, the value of the no-traffic monitoring timer is changed to a small value (short period) and the status of the call is changed from "a connected state" where the terminal's power consumption is high to "a disconnected state" where the terminal's power consumption is low, when no-traffic monitoring timer is expired.

Power consumption can be expected to decrease by changing the status of the call of the terminal which don't have a data to transmit, from the connected state to the disconnected state in a weak radio signal area.

Other objects, features and advantages of the invention will become apparent from the following description of the embodiments of the invention taken in conjunction with the accompanying drawings.

BRIEF DESCRIPTION OF THE DRAWINGS

FIG. 7 shows the relation between the power of radio signal which the terminal transmits and the value of the no-traffic monitoring timer.

FIG. 8 is a flow chart of a no-traffic monitoring function.

FIG. 9 is a flow chart of a power control monitoring function.

FIG. 10 shows changes in the status of the call in each case.

DETAILED DESCRIPTION OF THE EMBODIMENTS

Preferred embodiments for carrying out the present invention will be explained below in detail. However, the present invention should not be limited to these embodiments.

Figure 1:
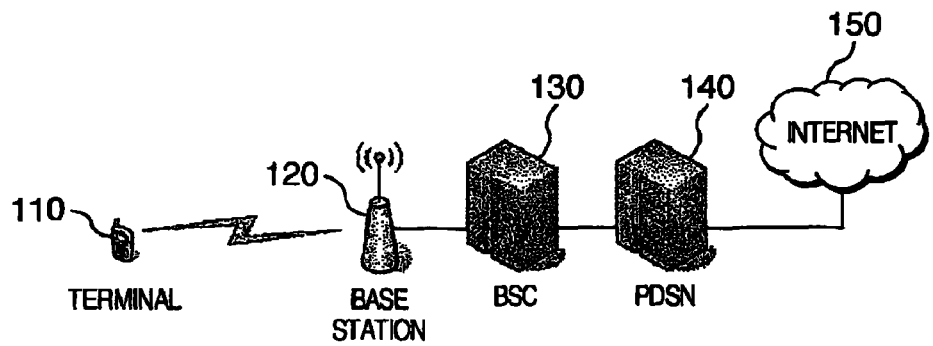
FIG. 1 is a network configuration of a wireless communication system.

FIG. 1 shows a configuration of a wireless communication system. The wireless communication system includes a terminal 110, a base station 120 for communicating with the terminal 110, a BSC 130 (Base Station Controller) for managing and controlling the operation of the base station 120, and a PDSN 140 (Packet Data Serving Node) for relaying a packet to connect with the Internet 150. By a user's operation of the terminal 110, the terminal can connect with the Internet 150 via the base station 120, the BSC 130 and the PDSN 140, and transmit and receive various data. The present embodiment is an invention relating to the terminal 110 having a no-traffic monitoring timer, and a configuration and an operation flow of the terminal 110 will be explained below.

Figure 2:
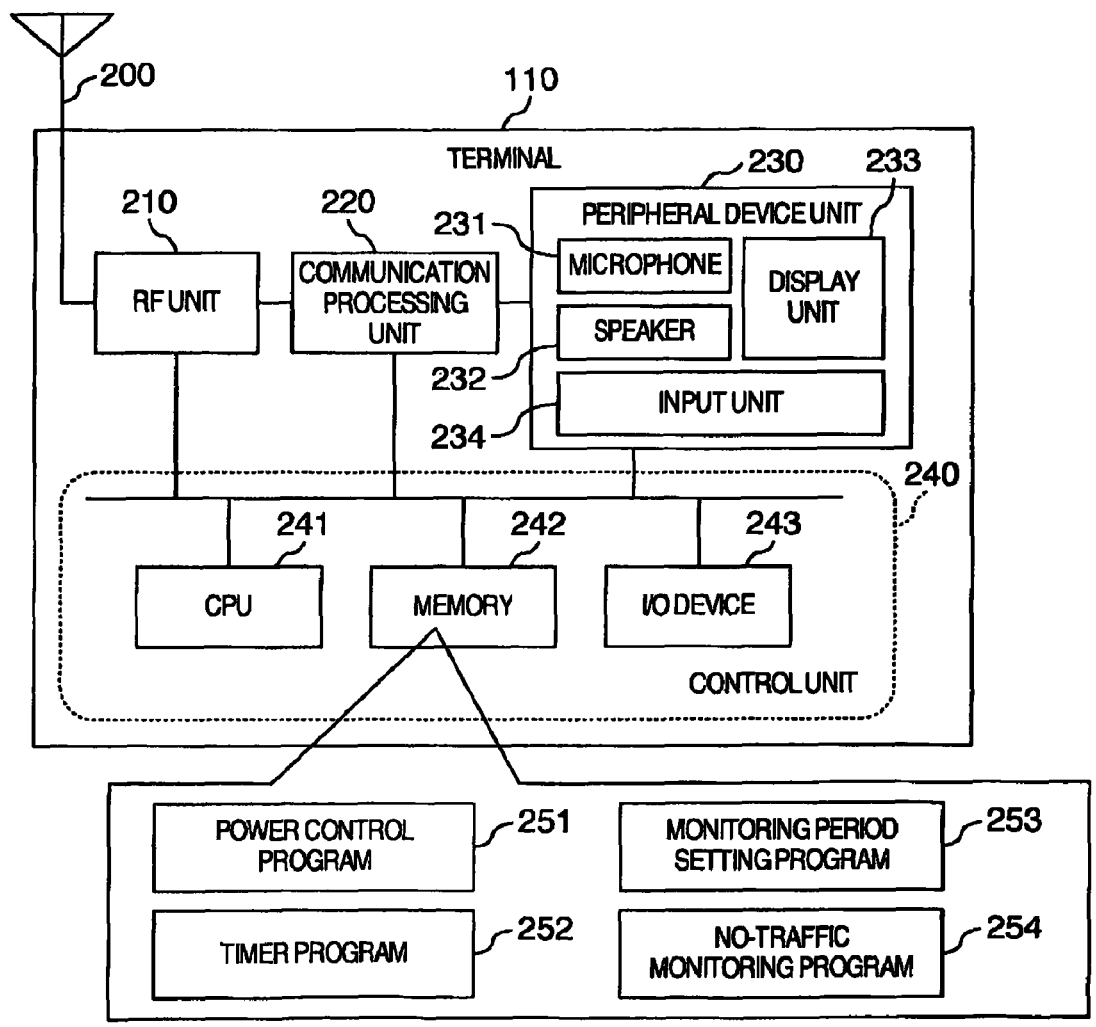
FIG. 2 is a hardware configuration of a terminal.

FIG. 2 is a block diagram showing a hardware configuration of the terminal 110. Specifically, it comprises an antenna 200 for transmitting and receiving wireless signals, an RF unit 210 for transforming the wireless signals to electric signals, a communication processing unit 220 for executing predetermined communication processing (including the processing such as signal termination, protocol transformation and failure monitoring) of the electric signals, a peripheral device unit 230 which a user of the terminal uses to input and output signals to be transmitted and received, and a control unit 240 for controlling of the terminal 110 as a whole.

The peripheral device unit 230 comprises a microphone 231 for inputting voices, a speaker 232 for outputting voices, a display unit 233 including a liquid crystal display etc. for displaying characters or picture images, and an input unit 234 including a keyboard etc. for inputting data or control signals (appointing access points etc.). In addition, the control unit 240 includes a CPU 241 which is a processer for controlling the operation of the terminal 110 as a whole, a memory 242 for storing operation programs or various data required in operations, and an I/O device 243 for transmitting and receiving signals to and from external devices. In addition, the memory 242 has a power control program 251 for executing power control, a timer program 252 for measuring a period, and a monitoring period setting program 253 for setting the value (monitoring period) of a no-traffic monitoring timer required for monitoring a no-traffic period, and a no-traffic monitoring program 254 for executing no-traffic monitoring. The CPU 241 reads out these programs from the memory 242 and executes them.

It will be explained below with reference to FIG. 3-FIG. 5 that power consumption of the terminal communicating with the base station varies depending on conditions.

Figure 3:
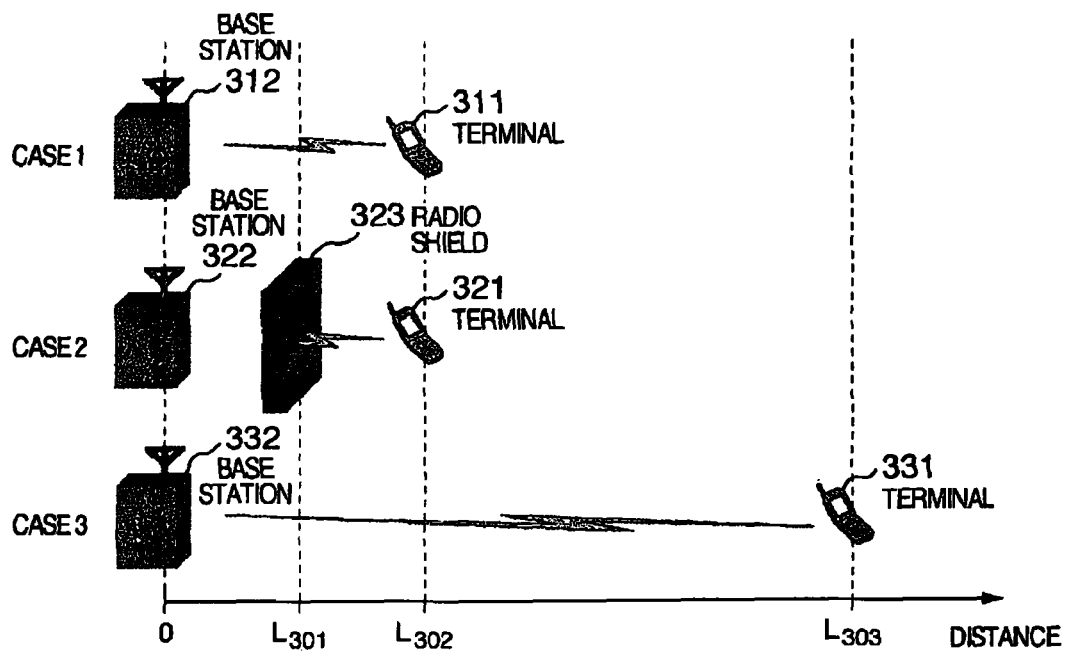
FIG. 3 shows cases of various positional relations among a terminal, a base station and a radio shield.

FIG. 3 shows cases of various positional relations among a terminal, a base station and a radio shield. The terminal shown here has a configuration similar to the terminal 110 of FIG. 1 and FIG. 2, and the base station communicates with the terminal similarly to the base station 120 of FIG. 1. In the case 1, the terminal 311 can exchange signals with the base station 312, and $L_{302}$ represents the distance between them. In the case 2, the terminal 321 can exchange signals with the base station 322, but a radio shield 323 is between the terminal 321 and the base station 322. Here, $L_{301}$ represents the distance between the base station 322 and the radio shield 323, and $L_{302}$ represents the distance between the base station 322 and the terminal 321. In the case 3, the terminal 331 can exchange signals with the base station 332, and $L_{303}$ represents the distance between them. In addition, the relation of these distances is $0<L_{301}<L_{302}<L_{303}$.

Figure 4:
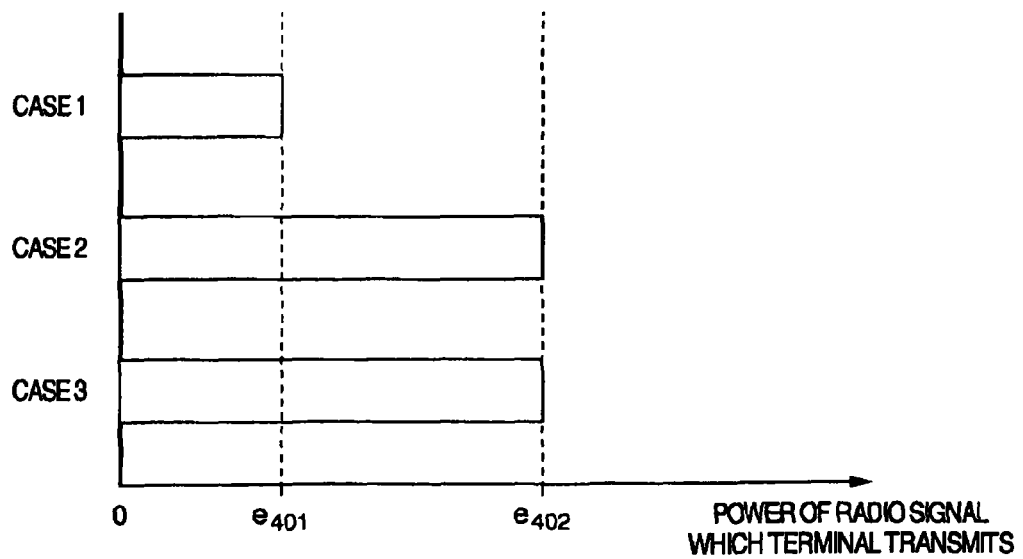
FIG. 4 shows the power of radio signal which the terminal transmits in each case.

FIG. 4 shows power of radio signal which the terminal transmits in the cases of various positional relations as showed in FIG. 3. Here, the "power of radio signal which the terminal transmits" indicates the power of radio signal which the terminal transmits to the base station. In the CDMA scheme, in order to solve the Near-Far Problem: "in the same time and the same frequency, the strong radio signal which a terminal near a base station transmits drowns out radio signal from a terminal far from the base station, and as a result, the base station is difficult to receive radio signal from the terminal far from itself", the power of radio signal which the terminal transmits is adjusted, so that the power of radio signal which the base station receives from any terminal becomes nearly constant.

FIG. 4 will be explained below in consideration on this point. In the case 2, because of the presence of the radio shield 323, the power of radio signal which the terminal 321 receives from the base station 322 is lower than the power of radio signal which the terminal 311 receives from the base station 312 in the case 1. Therefore, in the case where the terminal 321 transmits radio signal to the base station 322, the radio signal is attenuated by the presence of the radio signal shield 323. That is, in order to make the power of radio signal which the base station receives from any terminal nearly constant, the terminal 321 is required to transmit radio signal whose power is higher than the terminal 311.

In addition, in the case 3, because the distance between the terminal 331 and the base station 332 is $L_{303}$, the power of radio signal which the terminal 331 receives from the base station 332 is lower than the power of radio signal which the terminal 311 receives from the base station 312 in the case 1. Therefore, in the case where the terminal 331 transmits radio signal to the base station 332, the radio signal is attenuated because of the long distance. That is, in order to make the power of radio signal which the base station receives from any terminal nearly constant, the terminal 331 is required to transmit radio signal whose power is higher than the terminal 311. For the above reason, there is a relation that the power $e_{401}$ of radio signal which the terminal transmits in the case 1 is lower than the power $e_{402}$ of radio signal which the terminal transmits in the cases 2 and 3.

Figures 5, 6:
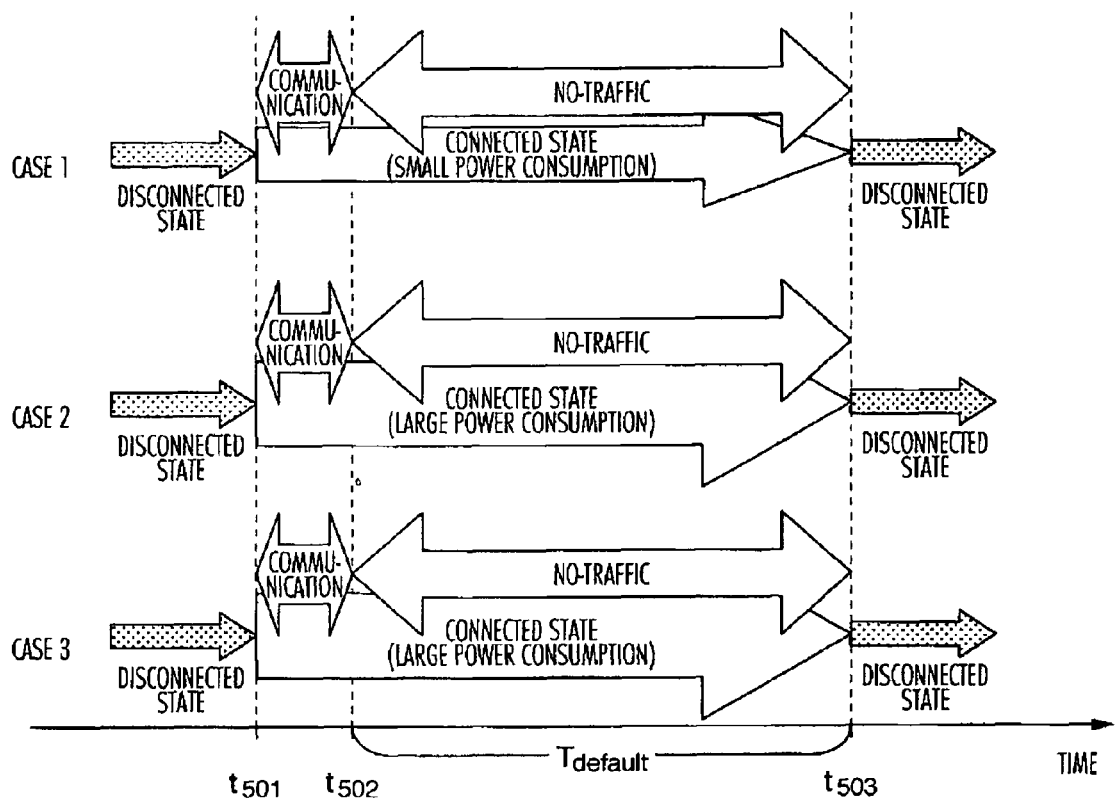
FIG. 5 shows change of the status of the call in each case.
FIG. 6 shows calculation equations of the values of the no-traffic monitoring timer.

FIG. 5 shows an example where the prior no-traffic monitoring function changes the status of the call in each case. Here, $T_{default}$ represents the value of a no-traffic monitoring timer (value representing the period for monitoring the no-traffic state) which is common to all of the cases 1 to 3 and a fixed value. In every case, starting user traffic at $t_{501}$ changes the status of the call from a disconnected state to a connected state, and the communication of a upper layer (such as UDP or TCP) is finished at $t_{502}$. Subsequently, at $t_{503}$ when the period $T_{default}$ has passed in the no-traffic state since $t_{502}$, the status of the call is changed to the disconnected state where the connection of a traffic channel is disconnected. Then, because the power of radio signal which the terminal transmits in the case 2 and the case 3 is higher than in the case 1 as shown in FIG. 4, the power consumption per unit time differs between them.

It was explained above that the terminal's power consumption varies depending on the conditions. A specific configuration and processing to reduce power consumption in the above case 2 or case 3 will be explained below with reference to FIG. 6 to FIG. 10.

FIG. 6 is an example of calculation equations for determining the value of the no-traffic monitoring timer based on the power of radio signal which the terminal transmits. In FIG. 6, "e" represents the power of radio signal which the terminal transmits used in calculation, "$E_{min}$" represents a minimal power of radio signal which the terminal transmits and the terminal can set it, "$E_{max}$" represents a maximal power of radio signal which the terminal transmits and the terminal can set it, "$E_S$" represents a boundary value of the power for judging which shall be used as the value of the no-traffic monitoring timer, $T_{default}$ or calculated T, and "$T_{min}$" represents a allowable minimal value of the no-traffic monitoring timer.

FIG. 7 shows the relation between the power of radio signal which the terminal transmits and the value of the no-traffic monitoring timer determined using calculation equations of FIG. 6. It should be noted that, although here the value of the no-traffic monitoring timer is determined based on the power of radio signal which the terminal transmits, it may be determined based on the power of radio signal which the terminal receives from the base station. In any case, it is possible to change the value of the no-traffic monitoring timer of the terminal by feeding back the information on radio signal conditions and thus to reduce power consumption by changing the status of the call from a connected state to a disconnected state in a weak radio signal area. In addition, here, $E_S$ is used, which represents the boundary value of the power of radio signal which the terminal transmits for judging which shall be used as the value of the no-traffic monitoring timer, $T_{default}$ or calculated T, but it may not be used. In addition, the value of the no-traffic monitoring timer may be determined without calculation using the calculation equations, with reference to the values of the no-traffic monitoring timer registered in advance which respectively correspond to several zones which the range of the power of radio signal which the terminal transmits is divided into.

As shown in FIG. 7, as the power of radio signal which the terminal transmits becomes higher (larger), the value (period) of the no-traffic monitoring timer becomes the smaller (shorter), while as the power of radio signal which the terminal transmits becomes lower (smaller), the value (period) of the no-traffic monitoring timer becomes larger (longer). Power consumption is defined by "[the power of transmitted radio signal]×[period of active call]", and thus the high consumption of the terminal powered on and transmitting radio signal can be reduced more by setting the value of the no-traffic monitoring timer at a small value (short period), because in this case the call is disconnected after expiration of small (short) period of the no-traffic monitoring timer. On the contrary, as the power of radio signal which the terminal receives becomes lower (smaller), the value (period) of the no-traffic monitoring timer becomes smaller (shorter), while as the power of radio signal which the terminal receives becomes higher (larger), the value (period) of the no-traffic monitoring timer becomes larger (longer).

FIG. 8 shows a flow chart of processing of a no-traffic monitoring function. Here, the outline of communication between the terminal and the base station will be explained. The terminal 110 and the base station 120 exchange signals via two kinds of channels, that is, a control channel for transmitting the control information required to connect between the terminal and base station, and a traffic channel for transmitting and receiving data. Here, because the control channel occupies a small part of the total channels in view of capacity, no trouble occurs even if they are always connected. However, because the traffic channel occupies a large part of the total channels in view of capacity, it is desirable in a system (for example, the system of the CDMA scheme) where the number of terminals connectable with each base station is limited, to close the connection of the traffic channel which has been used in the data transmission completed by the terminal. Accordingly, it is usual that the connection of the traffic channel is closed to free up the Radio resource when the communication of upper layer is finished, while the connected state of the control channel is maintained as it is.

Processing of the no-traffic monitoring function will be explained from the state where the terminal 110 and the base station 120 are connected and a user is communicating by this system (step 801). Subsequently, the user finishes user traffic (step 802). The control unit 240 of the terminal starts no-traffic monitoring on the traffic channel based on the finish of user traffic (step 803).

Then, the control unit 240 of the terminal reads out the value of the no-traffic monitoring timer memorized in the memory 242 (step 804). Subsequently, no-traffic monitoring is proceeded by using the value of this no-traffic monitoring timer, but if the value of the no-traffic monitoring timer is changed, it is updated as needed (step 805, step 806). It should be noted that the change of the value of the no-traffic monitoring timer occurs when the value of the no-traffic monitoring timer is reset by power control executed in parallel with no-traffic monitoring. This will be explained in detail with reference to FIG. 9.

Then, the control unit 240 of the terminal starts measuring the period (no-traffic period) for which the terminal neither transmits nor receives user traffic by using a timer (step 807). If a user of the terminal 110 resumes data traffic on upper layer before this no-traffic period reaches the period specified by the value of the no-traffic monitoring timer, the user traffic on the traffic channel is resumed. It should be noted that the timer is a function for the CPU 241 to read out the timer program 252 from the memory 242 and to execute it.

Accordingly, the control unit 240 of the terminal judges whether the user traffic is resumed after the step 807 or not (step 808). If the user traffic is resumed here, the process returns to the step 802, and when the user traffic is stopped, the process goes to the step 803. On the other hand, if the communication is not resumed, the connection of the traffic channel is closed when the no-traffic period reaches the period specified by the value of the no-traffic timer (steps 809, and 810). It should be noted that among various functions of the control unit 240, a function for executing no-traffic monitoring is referred to as a "no-traffic monitoring unit." This is a function for the CPU 241 to read out the no-traffic monitoring program 254 from the memory 242 and to execute it.

FIG. 9 is a flow chart of processing of a power control monitoring function for updating the value of the no-traffic monitoring timer of the step 806 in FIG. 8. The control unit 240 of the terminal starts the power control when the terminal is powered on (step 901). Here, the power control is the processing for changing the power of radio signal which the terminal 110 transmits to the base station 120 depending on the power of radio signal which it receives from the base station 120. For example, in the case where the power of radio signal which the terminal 110 receives from the base station 120 is low, the terminal 110 increases the power of radio signal which it transmits to the base station 120, while in the case where the power of radio signal which the terminal 110 receives from the base station 120 is high, the terminal 110 decreases the power of radio signal which it transmits to the base station 120. By the above control, the power of radio signal which the base station receives from the terminal located at any place becomes constant.

As described above, a base station has the Near-Far Problem: "in the same time and the same frequency, the strong radio signal which a terminal near a base station transmits drowns out radio signal from a terminal far from the base station, and as a result, the base station is difficult to receive radio signal from the terminal far from itself", but the problem is solved by such power control. It should be noted that among various functions of the control unit 240, a function for executing the power control is referred to as a "power control unit". This is a function for the CPU 241 to read out the power control program 251 from the memory 242 and to execute it. In each power control, the control unit 240 of the terminal calculates the value of the no-traffic monitoring timer using the calculation equations as shown in FIG. 6 based on the power of radio signal which the terminal 110 transmits (step 902). Then, it is judged whether the value of the no-traffic monitoring timer obtained by the calculation at the step 902 is the same as the value of the no-traffic monitoring timer calculated at the previous time and memorized in the memory 242 or not, and if it is the same, then the power control is completed (step 903).

On the other hand, if it is not the same, the value of the no-traffic monitoring timer is reset (updated) (step 904). Then, it is judged whether there is a direction of power control completion accompanying power off of the terminal 110 or not (step 905), and if there is the direction, the power control is completed, while if there is not the direction, the process returns to the step 902 (step 906). It should be noted that among various functions of the control unit 240, a function for setting the value (monitoring period) of the no-traffic monitoring timer is referred to as a "unit setting no-traffic monitoring timer value (monitoring period setting unit)." This is a function for the CPU 241 to read out the monitoring period setting program 253 from the memory 242 and to execute it. In addition, here, power on/off triggers to start/complete the power control, but another method without using power on/off may be used for triggering to start/complete the power control.

FIG. 10 shows an example where the status of the call in each case is changed according to the present invention. Here, $T_{default}$ represents the value of the no-traffic monitoring timer in the case 1, and $T_{Short}$ similarly represents the value of the no-traffic monitoring timer in the case 2 and the case 3. It should be noted that $T_{default}$ and $T_{Short}$ are values determined using the calculation equations of FIG. 6 based on the power of radio signal which the terminal transmits in each case shown in FIG. 4. In every case, a disconnected state is changed to a connected state by starting the user traffic at $t_{1101}$, and the user traffic is finished at $t_{1102}$. Subsequently, in the case 2 and the case 3 of large power consumption, when the period of $T_{short}$ has passed in the no-traffic state since $t_{1102}$ and the no-traffic state reaches $t_{1103}$, the status of the call is changed to disconnected state. In addition, in the case 1 of small power consumption, when the period of $T_{default}$ has passed in the no-traffic state since $t_{1102}$ and the no-traffic state reaches $t_{1104}$, the status of the call is changed to disconnected state.

By using a configuration for automatic control of the no-traffic monitoring as described above in a wireless terminal, the value of the no-traffic monitoring timer of the terminal can be changed by feeding back the information on radio signal conditions, and thus power consumption can be reduced significantly than in prior arts. It should be noted that power consumption in a connected state and power consumption in a disconnected state will be compared below specifically. Considering ordinary communication operation on the communication standard (CDMA2000 1x EV-DO standard), in a connected state, synchronization signal is transmitted once in at least 26 ms via a Reverse Traffic Channel (RTC) and the constant monitoring and data transmission are executed by using a Control Channel (CC) and a Forward Traffic Channel (FTC).

As compared with the above, in a disconnected state, the control channel (CC) monitors for 426 ms at an interval of 5120 ms but neither the transmission of synchronization signal nor data transmission is executed (refer to 3GPP2 Specification, C.S. 0024 AV3.0:10.2 Default Control Channel MAC Protocol, and 11.1 Default (Subtype 0) and Subtype 1 Physical Layer Protocol Instances). Therefore, it is understood that the power consumption of communication operation in a disconnected state is incomparably smaller than that in a connected state.

In addition, in the case where the period specified by the value of the no-traffic monitoring timer is a short period, it is considered as a demerit that a disconnected state and a connected state are frequently repeated in packet transmission, resulting that it takes long to process the required connecting operation. On the other hand, in the case where the period specified by the value of the no-traffic monitoring timer is a long period, it is considered as a demerit that since a connected state is maintained as it is even in a no-traffic state, power consumption becomes high and wireless resources are occupied during that period.

In comparing these two demerits in view of trends of recent wireless communication systems such as shortening a period required in a connecting operation by enhancing wireless processing speed, battery consumption by various functions other than communication which a recent terminal has, and lack of wireless resources around a base station due to the increase of users, it is considered that the demerit is small if the value of the no-traffic monitoring timer is short, while it is large if the value of the no-traffic monitoring timer is long.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless terminal for communicating with a base station so as to reduce the wireless terminal's power consumption by disconnecting a traffic channel while maintaining a control channel, comprising:
   a power control unit for measuring a power of a radio signal received from said base station;
   a timer for measuring a period;
   a monitoring period setting unit for changing a length of a monitoring period based on the power of the radio signal measured by said power control unit; and
   a no-traffic monitoring unit for disconnecting a connection of a traffic channel while maintaining a control channel, when a period of a no-traffic state measured by said timer reaches said monitoring period in a state where said base station and said wireless terminal is connected via said traffic channel.

2. The wireless terminal according to claim 1, wherein said monitoring period setting unit judges whether the power of the radio signal measured by said power control unit has changed or not, and changes the monitoring period if it has changed.

3. The wireless terminal according to claim 1, wherein as the power of the radio signal received from said base station becomes lower, said monitoring period setting unit sets said monitoring period at a shorter period.

4. A wireless terminal for communicating with a base station so as to reduce the wireless terminal's power consumption by disconnecting a traffic channel while maintaining a control channel, comprising:
   a power control unit for determining a power of a radio signal transmitted to said base station based on a power of a radio signal received from said base station;
   a timer for measuring a period;
   a monitoring period setting unit for changing a length of a monitoring period based on the power of the radio signal determined by said power control unit; and a no-traffic monitoring unit for disconnecting a connection of a traffic channel while maintaining the control channel, when the period of a no-traffic state measured by said timer reaches said monitoring period, in a state where said base station and said wireless terminal is connected via said traffic channel.

5. The wireless terminal according to claim 4, wherein said monitoring period setting unit judges whether the power of the radio signal determined by said power control unit has changed or not, and changes the monitoring period if it has changed.

6. A wireless terminal for communicating with a base station so as to reduce the wireless terminal's power consumption by disconnecting a traffic channel while maintaining a control channel, comprising:

a power control unit for measuring a power of a radio signal received from said base station;

a timer for measuring a period;

a monitoring period setting unit for varying a length of a monitoring period dependent upon the power of the radio signal measured by said power control unit; and a no-traffic monitoring unit for disconnecting a connection of a traffic channel while maintaining the control channel, when the period of a no-traffic state measured by said timer reaches said monitoring period from said monitoring period setting unit, in a state where said base station and said wireless terminal is connected via said traffic channel.

7. The wireless terminal according to claim 6, wherein said monitoring period setting unit judges whether the power of the radio signal measured by said power control unit has changed or not, and varies the monitoring period if it has changed.

8. The wireless terminal according to claim 6, wherein as the power of the radio signal received from said base station becomes lower, said monitoring period setting unit sets said monitoring period at a shorter period.

* * * * *